(12) United States Patent
Meldrum

(10) Patent No.: US 6,523,276 B1
(45) Date of Patent: Feb. 25, 2003

(54) PRODUCE DRYING SYSTEM UTILIZING MULTIPLE ENERGY SOURCES

(76) Inventor: Charles R. Meldrum, 125 Kenwood Rd., Grosse Pointe Farms, MI (US) 48236

(*) Notice: Subject to any disclaimer, the term of this patent is extended or adjusted under 35 U.S.C. 154(b) by 0 days.

(21) Appl. No.: 09/663,783

(22) Filed: Sep. 14, 2000

Related U.S. Application Data

(60) Provisional application No. 60/153,832, filed on Sep. 14, 1999.

(51) Int. Cl.[7] ............................................... F26B 25/06
(52) U.S. Cl. ................................ 34/217; 34/68; 34/69; 34/258; 34/264; 34/267; 99/451; 426/241
(58) Field of Search ........................... 34/256, 258, 262, 34/265, 264, 267, 275, 68, 69, 217; 426/241, 242, 465, 467, 520; 99/451

(56) References Cited

U.S. PATENT DOCUMENTS

| | | | | |
|---|---|---|---|---|
| 4,468,865 A | * | 9/1984 | Inagaki | 34/68 |
| 5,893,217 A | * | 4/1999 | Johanson et al. | 34/266 |
| 5,980,962 A | * | 11/1999 | Bracken et al. | 426/241 |
| 6,105,273 A | * | 8/2000 | Johanson et al. | 34/267 |
| 6,233,841 B1 | * | 5/2001 | Beach | 34/262 |

* cited by examiner

*Primary Examiner*—Denise L. Esquivel
*Assistant Examiner*—Kathryn S. O'Malley
(74) *Attorney, Agent, or Firm*—Cantor Colburn LLP

(57) ABSTRACT

Methods and systems for extending the shelf life of produce are disclosed which provide an accelerated drying process for washed produce in order to further clean and fully crystallize a layer of solute-laden slurry that has been applied on the external surface of an item of produce (20). The drying process typical comprises three basic steps. The first step (10) is to mechanically remove excess moisture from the solute-laden slurry to form a moisture-reduced slurry layer (22) on the external surface of the item of produce (20). The second step (12) is to employ heat and/or light energy to accelerate the in-situ moisture removal process to create a protective stratum (24) on the external surface of the item of produce (20). The third step (14) is to further remove remaining moisture to permit the formation of crystalline structures (26) on the external surface of the item of produce (20).

8 Claims, 3 Drawing Sheets

PRODUCE DRYING SYSTEM UTILIZING MULTIPLE ENERGY SOURCES

CROSS-REFERENCE TO RELATED APPLICATION

This patent application claims priority to U.S. provisional patent application Serial No. 60/153,832 filed Sep. 14, 1999, the entire specification of which is incorporated herein by reference.

BACKGROUND OF THE INVENTION

1. Field of the Invention

The present invention relates generally to methods and systems for the accelerated drying of produce and for drying films on produce for food preservation purposes, and more particularly to accelerated drying methods and systems that are used to eliminate or reduce pathogens on the outermost surface layers of the produce during the drying process, and to simultaneously dry a protective coating or film on the produce, which film may be formed from a solute-laden slurry applied to the external surface of an item of produce during a washing step or thereafter.

2. Discussion of the Related Art

The freshness of fruits and vegetables, generally referred to as produce, is typically defined by the qualities of taste, texture and appearance. Due to certain physiological effects, produce generally begins to deteriorate and lose its freshness at the time of harvest. Once severed from the parent plant, produce no longer has the natural life-sustaining nutrients and fluids and the immune-like system of the plant to combat bacteria, fungi, viruses, and other pathogens which eventually deteriorate the produce. A significant percentage of most produce harvested for shipment and consumption at distant locations are thus lost due to such deterioration. Because of the immense size of the produce industry, it would be highly advantageous from an economic standpoint to preserve recently harvested produce in its fresh, savory condition for an extended period of time. Others have long recognized this. Hence, many different methods for extending produce shelf life have been developed.

Refrigeration has been the most popular method of increasing the useful life of fresh produce. By storing produce at a suitably low temperature, it is possible to extend the freshness by retarding ripening, softening, textural changes and color changes. Lower temperatures also reduce undesirable metabolic changes and moisture losses, and help prevent or slow undesirable pathogen growth on the produce. However, depending on the length of time and degree to which the produce is chilled, refrigeration generally adversely affects taste and quality. Not all produce can be successfully refrigerated to low temperatures. Excessive chilling, particularly at near freezing temperatures, can actually damage most types of produce. Even moderate chilling will interfere with the ripening processes of certain produce, such as bananas.

Other methods of extending produce shelf life include coating the produce with a protective material, such as wax. However, the success of the coating is related not only to how well the coating protects the produce, but also how well it maintains a desirable appearance of the produce, without affecting its taste. Consequently, the success of this method has been limited. It has also been attempted to lengthen the shelf life of produce through heating to reduce the microorganism population, then refrigerating it at a desirable temperature. The success of this process has been limited in that shelf life has not been significantly increased. It is also known to harvest produce prior to ripening, and then treat the produce with a ripening agent, such as ethylene gas, to effect ripening. This process has generally provided a low quality, unflavorful product, particularly in the case of tomatoes. Furthermore, the deterioration process begins at the time of harvest regardless of ripeness of the produce.

A more recent approach to extending the shelf life of produce, and tomatoes in particular, has been the employment of genetic engineering techniques to decrease the rate in which tomatoes are affected by at least selected types of microorganisms. Such a process can be viewed as overly complicated to accomplish the goals of extended freshness, and has also enjoyed only limited success. Additionally, certain countries prohibit or strictly regulate the growth, sale, and distribution of genetically altered or modified produce, thus cutting off potential markets to produce growers and distributors.

Another approach to extending produce shelf life is described in U.S. Pat. No. 5,229,152 (the '152 patent) and U.S. Pat. No. 5,364,648 (the '648 patent) issued to Meldrum, the entire specifications of which are expressly incorporated herein by reference. The '152 and '648 patents describe a method and apparatus for increasing the shelf life of produce by employing a "snap freezing" procedure. By "snap freezing" it is meant subjecting the produce to temperatures substantially at or below the freezing point of water for a very brief predetermined period of time without the produce flesh being frozen. The method described in the '152 and '648 patents include the step of first introducing an item of produce into a heated bath being vibrated generally at a frequency within the range of subsonic to ultrasonic frequencies for a predetermined time, preferably shortly after harvest, to clean the produce. Next, the item of produce is transferred to a nucleation vat containing a natural slurry generally comprising natural material extracts including predetermined concentrations and combinations of byproducts from the fruit or vegetable being processed, low solute concentrations of sucrose sugars, fruit and/or acetic acids, enzymes, and a water solvent carrier. The slurry is referred to as "solute-laden," in that the slurry is substantially concentrated with various solutes, especially sugars, enzymes, and acids, in the liquid solvent, such as water. The slurry also has a relatively high moisture content.

The slurry is maintained at a temperature below the freezing point of water in order to snap freeze the item of produce. The item of produce is then "snap frozen" by immersing it in the cold slurry for a brief predetermined period of time. Because the item of produce is held in the nucleation vat for only a brief period of time, the flesh of the item of produce itself will not actually be frozen. Finally, the item of produce is transferred from the nucleation vat to an incubation chamber and held there for a predetermined time, generally at ambient temperatures. This incubation, or drying, stage is used to stabilize and dry the item of produce in order to fully dry and crystallize a film of the slurry on the outer surface of the item of produce. The film includes amorphous crystalline structures and/or microcrystalline structures that are formed on the outer surface of the item of produce, for example, along and within the external surfaces of the pores of the item of produce. This dried film substantially protects the produce from external pathogens, such as bacteria and fungi. The incubation stage generally takes from tens of minutes to several hours, and even as long as 48 hours. The item of produce can then be stored or displayed for extended periods of time without significant deterioration or loss of taste, texture and appearance, or the need for refrigeration.

Although the methodology disclosed in the '152 and '648 patents has increased the shelf life of produce as compared to previous conventional methods, an incubation period of even several minutes per item of produce is generally not preferred by produce growers, processors and distributors from a volume or efficiency standpoint. This is due, in large part, to the advent of highly rapid and mechanized produce processing operations, with the resultant increase in production volume requirements and decrease in the amount of time that produce can economically stay on drying conveyors or racks.

Therefore, the need still exists for methods and apparatus capable of rapidly and effectively accelerating the drying process used to dry a coating such as film on produce, and to simultaneously eliminate or at least reduce the pathogens present on the produce and/or in a coating or film, so that the produce will be better protected against internal and external pathogens, and will also be made ready for quicker packaging and distribution. There is a related need for accelerated the methods and systems for drying produce which are suitable for drying a film on produce that is formed from a solute-laden slurry previously applied to the outer surface of the produce, so as to crystallize that layer to form a protective barrier against external pathogens.

Therefore it is an object of the present invention to provide new and improved methods of and systems for extending the shelf life of produce by eliminating or at least reducing the number of pathogens found on the uppermost layers of harvested produce.

It is another object of the present invention to provide new and improved methods and systems of rapidly drying a film made up of a solute-laden slurry layer applied to the external surface of an item of produce, and in so drying the slurry layer, produce desirable crystallized structures within the dried film.

It is another object of the present invention to provide new and improved methods and systems of accelerating the drying of a solute-laden slurry layer applied to the external surface of an item of produce.

SUMMARY OF THE INVENTION

In order to overcome the aforementioned disadvantages and achieve many of the aforementioned objects of the present invention, there is provided, in accordance with a first aspect of the present invention, a first method of extending the shelf life of harvested produce. This method involves removing pathogens from the outermost layer of the produce. The method comprises the steps of:

(1) subjecting the produce to a first treatment procedure which includes applying a first mechanical force to the outermost surface layer of produce;

(2) subjecting the produce to a second treatment procedure, wherein the second treatment procedure includes directing electromagnetic energy in a first range of frequencies from at least a first radiant energy source to at least the outermost surface layer of produce; and (3) subjecting the produce to a third treatment procedure, wherein the third treatment procedure includes applying heat energy from at least a first heat energy source to at least the outermost surface layer of produce. Each of the steps is preferably performed in a way that removes or neutralizes pathogens or at least helps slow down their growth, as will be further described below.

In accordance with a second aspect of the present invention, there is provided a second method of extending the shelf life of harvested produce. This method is preferably utilized after the washing the produce with a solution which includes water. This method works by removing pathogens from the outermost layer of the produce during the drying of the produce after washing. This second comprises the steps of:

(1) subjecting the produce to a first drying procedure, wherein at least a portion of any excess water from the washing is removed, wherein the first drying procedure includes applying a first mechanical force to the outermost surface layer of produce;

(2) subjecting the produce to a second drying procedure, wherein at least a portion of the moisture remaining on the outermost surface layer of the produce is removed, wherein the second drying procedure includes directing electromagnetic energy in a first range of frequencies from at least a first radiant energy source to at least the outermost surface layer of produce; and (3) subjecting the produce to a third drying procedure, wherein at least a portion of the moisture remaining on the outermost surface layer of the produce is removed, wherein the third drying procedure includes applying heat energy from at least a first heat energy source to at least the outermost surface layer of produce.

In accordance with a third aspect of the present invention, a third method of extending the shelf life of produce is provided. This method is designed for use with produce, which either from a previous washing step or dipping step, has a solute-laden slurry layer containing water applied to at least a portion of the outermost surface thereof. This third method comprises the steps of:

(1) subjecting the produce to a first drying procedure, wherein at least a portion of the moisture in the solute-laden slurry layer is removed to form a moisture-reduced slurry layer on the produce, wherein the first drying procedure includes applying a stream of air and a vibratory force to the produce;

(2) subjecting the produce to a second drying procedure, wherein at least a portion of the moisture in the moisture-reduced slurry layer is removed to form a protective stratum on the produce, wherein the second procedure includes applying the energy from at least one energy source to the produce; and (3) subjecting the produce to a third drying procedure, wherein at least a portion of the moisture in the protective stratum is removed to form a protective crystalline structure on the produce, wherein the third drying procedure includes applying the energy from at least one energy source to the produce.

In accordance with a fourth aspect of the present invention, a fourth method of extending the shelf life of produce is provided, wherein the produce has a solute-laden slurry layer applied to at least a portion of the external surface thereof, comprising: (1) subjecting the produce to a first drying procedure, wherein at least a portion of the moisture in the solute-laden slurry layer is removed to form a moisture-reduced slurry layer on the produce; (2) subjecting the produce to a second drying procedure, wherein at least a portion of the moisture in the moisture-reduced slurry layer is removed to form a protective stratum on the produce; and (3) subjecting the produce to a third drying procedure, wherein at least a portion of the moisture in the protective stratum is removed to form a protective film on the produce, which film preferably includes crystalline structural components.

In accordance with a fifth aspect of the present invention, a fifth method of extending the shelf life of produce is provided. In this method, the produce has a solute-laden slurry layer applied to at least a portion of the external surface thereof before the process is begun. This fifth method comprises:

(1) subjecting the produce to a first drying procedure, wherein at least a portion of the moisture in the solute-laden slurry layer is removed to form a moisture-reduced slurry layer on the produce, wherein the first drying procedure includes applying a stream of air to the produce;

(2) subjecting the produce to a second drying procedure, wherein at least a portion of the moisture in the moisture-reduced slurry layer is removed to form a protective stratum on the produce, wherein the second procedure includes applying the energy from at least one energy source to the produce; and (3) subjecting the produce to a third drying procedure, wherein at least a portion of the moisture in the protective stratum is removed to form a protective film, preferably including crystalline structures on the produce, wherein the third drying procedure includes applying the energy from at least one energy source to the produce.

In accordance with a sixth aspect of the present invention, there is provided a sixth method of extending the shelf life of produce. Again, the produce already has a solute-laden slurry layer applied to at least a portion of the external surface thereof. The sixth method comprises the steps of:

(1) subjecting the produce to a first drying procedure, wherein at least a portion of the moisture in the solute-laden slurry layer is removed to form a moisture-reduced slurry layer on the produce, wherein the first drying procedure includes applying a vibratory force to the produce;

(2) subjecting the produce to a second drying procedure, wherein at least a portion of the moisture in the moisture-reduced slurry layer is removed to form a protective stratum on the produce, wherein the second drying procedure includes applying energy from at least one energy source to the produce; and (3) subjecting the produce to a third drying procedure, wherein at least a portion of the moisture in the protective stratum is removed to form a protective film on the produce, which film preferably includes crystalline components wherein the third drying procedure includes applying the energy from at least one energy source to the produce.

In accordance with a seventh aspect of the present invention, a seventh method of extending the shelf life of produce is provided. As in some of the previous methods, the produce has a solute-laden slurry layer applied to at least a portion of the external surface thereof. The method comprises the steps of:

(1) subjecting the produce to a first drying procedure, wherein at least a portion of the moisture in the solute-laden slurry layer is removed to form a moisture-reduced slurry layer on the produce, wherein the first drying procedure includes applying a stream of air and a vibratory force to the produce;

(2) subjecting the produce to a second drying procedure, wherein at least a portion of the moisture in the moisture-reduced slurry layer is removed to form a protective stratum on the produce, wherein the second drying procedure includes applying energy from at least one energy source to the produce; and (3) subjecting the produce to a third drying procedure, wherein at least a portion of the moisture in the protective stratum is removed to form a protective film or layer on the produce, which layer of film includes crystalline structures, wherein the third drying procedure includes applying energy from at least one energy source to the produce.

The present invention, in accordance with a first embodiment of the present invention, there is provided a first apparatus or system for extending the shelf life of harvested produce by removing pathogens from the outermost layer of the produce. The apparatus or system minimally comprises:

(1) a selectively operable first mechanical force assembly for directing a mechanical force to impinge upon the produce;

(2) a selectively operable first energy source assembly for directing a first form of non-mechanical energy at the outermost layer of the produce; and (3) a selectively operable second energy source assembly for directing a second form of non-mechanical energy at the outermost layer of the produce.

In accordance with a second embodiment of the present invention, a second apparatus is provided for extending the shelf life of produce. The apparatus is preferably used with the produce that has a solute-laden slurry layer applied to at least a portion of the external surface thereof. The apparatus is comprised of at least the following assemblies: (1) a selectively operable air stream assembly for directing an air stream to the produce; (2) a selectively operable first energy source assembly for directing energy to the produce; and (3) a selectively operable second energy source assembly for directing energy to the produce.

In accordance with third embodiment of the present invention, a third apparatus for extending the shelf life of produce is provided. This apparatus is preferably used with produce which has a solute-laden slurry layer applied to at least a portion of the external surface thereof. This apparatus comprises:

(1) a selectively operable air stream assembly for directing an air stream to the produce in order to remove at least a portion of the moisture in the solute-laden slurry layer to form a moisture-reduced slurry layer on the produce;

(2) a selectively operable first energy source assembly for directing energy to the produce in order to remove at least a portion of the moisture in the moisture-reduced slurry layer to form a protective stratum on the produce; and (3) a selectively operable second energy source assembly for directing energy to the produce in order to remove at least a portion of the moisture in the protective stratum to form a protective crystalline structure on the produce.

In accordance with a fourth embodiment of the present invention, a fourth apparatus for extending the shelf life of produce is provided, which is also preferably used with produce that has a solute-laden slurry layer applied to at least a portion of the external surface thereof. This fourth apparatus includes:

(1) a selectively operable air stream assembly for directing an air stream to the produce in order to remove at least a portion of the moisture in the solute-laden slurry layer to form a moisture-reduced slurry layer on the produce;

(2) a selectively operable first energy source assembly for directing energy to the produce in order to remove at least a portion of the moisture in the moisture-reduce slurry layer to form a protective stratum on the produce;

(3) a selectively operable second energy source assembly for directing energy to the produce in order to remove at least a portion of the moisture in the protective stratum to form a protective crystalline structure on the produce; and (4) a selectively operable transportation assembly for transporting the produce from the air stream assembly, first energy source assembly, and second energy source assembly.

In accordance with a fifth embodiment of the present invention, there is provided a fifth apparatus for extending the shelf life of produce. Again, the produce preferably has a solute-laden slurry layer applied to at least a portion of the external surface thereof. The fifth apparatus comprises:

(1) a selectively operable vibration assembly for vibrating the produce;

(2) a selectively operable first energy source assembly for directing energy to the produce; and (3) a selectively operable second energy source assembly for directing energy to the produce.

Other features and advantages of the present invention will be become apparent from the following description and appended claims, taken in conjunction with the accompanying Figures.

BRIEF DESCRIPTION OF THE DRAWINGS

In order to appreciate the manner in which the advantages and objects of the invention are obtained, a more particular description of the invention will be rendered by reference to specific methods and embodiments thereof which are illustrated in part in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
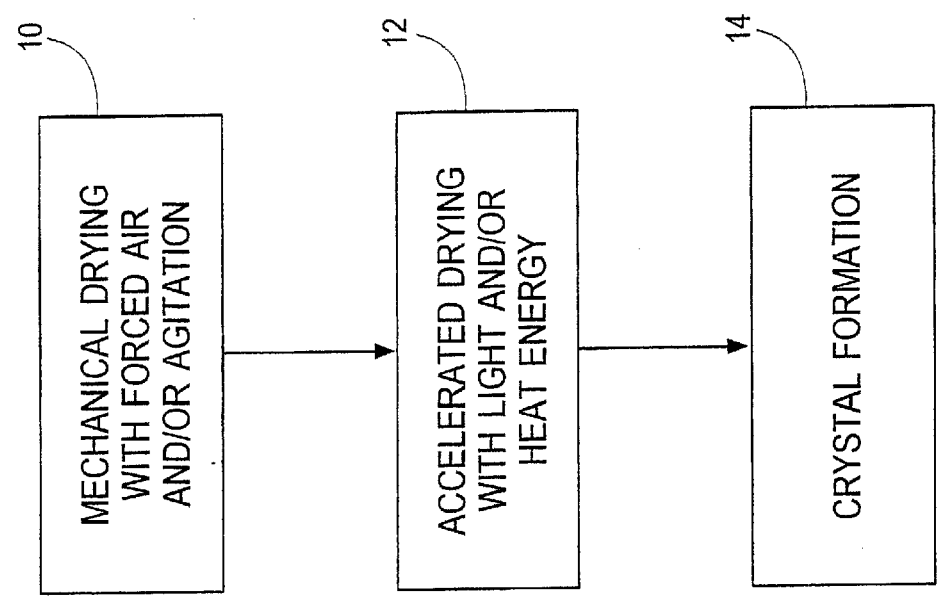
FIG. 1 is a flow chart illustrating the major produce drying steps, in accordance with one aspect of the present invention.

Although the present invention is primarily directed toward methods and apparatus for the accelerated drying of a solute-laden (e.g., protein, enzyme, starch or sugar-containing) slurry layer on an item of produce, it should be appreciated that the present invention can be practiced with different protective coatings or films including wax and with many kinds of produce and other natural food forms that require surface drying, whether normally accelerated or not.

One of the benefits of the produce drying methods and apparatuses of the present invention is that they can be used to kill residual bacteria, fungi, certain types of viruses, and other pathogens that remain on the surface of the produce after a washing-based cleaning process has been completed. Alternatively, these microorganisms can be substantially dried, neutralized and/or locked harmlessly into the film or crystal matrix or lattice residing generally atop the epithelial tissue of the produce (i.e., the top, outermost, or external layer) or even in the pores or crevices of this outer layer of the produce.

Another benefit of the drying methods and apparatuses of the present invention is that they can be used to cause a quicker mechanical interlocking of the micro-crystals of the crystalline structures or matrix into the surface of the produce. Basically, the tissue of the produce when viewed at a highly magnified, microscopic level has a very uneven three-dimensional topography including a series of crevices, fissures and asperities that are used for active osmotic exchange. Such tiny or microscopic surface openings are normal and often necessary to allow the living plant to breathe and/or exchange nutrients in the air. However, these outer surface openings are harbors for various types of microorganisms, including those mentioned above that are pathogenic. To eliminate, or at least substantially, reduce the likelihood of significant deleterious infection of the outer layer of produce, it is desirable to remove or neutralize these pathogens, and then preferably seal the outermost surface of the produce, especially these outer surface openings, to avoid the re-introduction of the pathogens. This in turn allows the produce, which is generally uncontaminated internally, to remain pristine and pure.

It is important to note that typical spoilage mode of food, especially produce, is rotting from the outside in, as opposed to from the inside out. In this regard, the outer surface openings of produce may still contain considerable amounts of bacteria, fungi, viruses or other pathogens, even after being subjected to conventional washing and drying processes. If left undisturbed, one or more these pathogen outposts may multiply or otherwise grow and cause classic forms of produce rot. Accordingly, the methods and systems of the present invention subject the outermost layer of the produce to one or more treatment steps that: (1) help dry off the produce after washing, thus drying out the outer surface openings and adjacent smoother topographical areas of the epithelial layer, in order to retard growth of the pathogens; and (2) help substantially eliminate, kill and/or neutralize the pathogens; and/or (3) at least reduce the number of live or active pathogens that are harbored on this outer layer and in the outer surface openings, which will eventually grow on or within the produce and cause deterioration if not inhibited.

Additionally, the drying methods and apparatuses of the present invention tend to help produce a film that covers the produce in a manner that is substantially impermeable to pathogens for up to several weeks or longer. For example, when the methods and systems of the present invention are used to treat produce which already has a polymerized coating, such as wax, other paraffins or edible organic or synthetic substances (which are typically hydro-carbon based), applied to the outer surface of the produce, several benefits result that represent improvements over the prior art processes that do not involve independent supplementary energy application and/or heating steps. First, the pathogens in the outer surface openings which are trapped under the polymerized coatings that are still alive tend to be killed or neutralized so that they do not grow at all, or at least so that they do not grow as vigorously. Second, the ultrasound, heating and/or energy irradiation steps each assist in pushing or flowing the coating such as wax further into (that is, more deeply into) and/or in better contact with, the outer surface openings than the coating such as wax otherwise would tend to reach, thus permitting the coating to enter more deeply and more thoroughly than it otherwise could or would if the coating were merely sprayed on, vapor-deposited, or put on by dipping. The result of this deeper penetration is that the coating such as wax tends to more completely envelope the pathogens found there, thus helping to destroy and/or neutralize them.

Third, the substantial heating effects of the treatment processes of the present invention are confined to the outermost layer of the produce, usually to a depth of penetration on the order of about 0.1 millimeters (mm) to about 7 mm, with depths of about 0.2 mm to about 5 mm being more preferred, and depths of about 0.3 mm to about 3 mm being presently preferred, relative to most produce with thinner skins, like strawberries, apples, pears and grapes. For produce with thicker skins like oranges, bananas, mangos, pineapples and eggplants, greater depths of penetration in the range of about 0.5 mm to about 10 mm are acceptable. Since the skin or outermost surface layer of produce is usually among the toughest and most durable layers in most kinds of produce, heating wax or other protective coatings to elevated temperatures on a very temporary basis is well tolerated by the natural cells of the produce, and is not expected to significantly harm most produce on a macroscopic level. For certain thin-skinned produce, like certain varieties of tomatoes, reduced heating may be required in order to avoid splitting the skin open, and the following generalization may not apply to them.

Generally, the heating of a protective coating and the immediately adjacent outer surface of the produce upon which the protective coating sits to elevated temperatures that are hot enough to kill, neutralize, or otherwise mitigate the detrimental effects of pathogens is realizable with harming the vast bulk of the edible pulp of the produce beneath that outer layer or skin. The brief heating of the protective coating such wax or a slurry to elevated temperatures helps neutralize the pathogens in a variety of ways, including destroying cellular walls, nuclei or other vital components of the cell structure of the pathogens, which typically are bacteria, fungi, and viruses resident in or on the outermost surface layer of the produce. Preferably the coating and adjacent outer surface temperatures are increased by the irradiation and/or heating steps of the present invention to levels in the range of about 50° C. to about 150° C. for about 0.1 seconds to about 15 seconds, with temperature ranges between 60° C. to about 120° C. being presently preferred, and with heating exposure times between about 0.3 seconds to about 10 seconds being presently preferred for most forms of produce, with the longer times preferably being associated with the lower temperatures.

Fourth, the heating and/or irradiating steps, if performed at suitably low to moderate temperatures and for the right amount of time, especially in the presence of either ultrasonic vibration or warm forced air, will also assist in more uniformly spreading the polymer coating such as wax over isolated spots of the produce where the wax film may not be present or may be too thin, particularly if that protective coating layer was sprayed on and the coverage was spotty on certain places on the produce.

The same advantages associated with the methods and systems of the present invention that were just described with respect to wax are also generally applicable to a number of other known protective coatings or sprays, particularly of the self-hardening variety, which are applied for preservation purposes to some types of produce in various parts of the world.

With regard to the solute slurries which dry and harden, particularly via crystalline growth, the methods and systems of the present invention are also advantageous. A previously noted, such slurries, upon the evaporation of the carrier/solvent, exhibit amorphous and microcrystalline growth, so that many microminiature interlocking crystalline structures are formed. The remaining solvent typically polymerizes or hardens into an ultra-thin somewhat tough and semi-flexible layer. In other words, as the moisture is removed in a certain micro-areas of the solute-laden solution, crystallization and polymerization will be initiated. The polymerization site may well be localized to a parent receptor site on the outside surface of the produce. For example, this crystal nuclei may already exist right at the edge of the crevice. As the crystal growth takes place, the crystals which are growing from these various sites will meet and engage one another, thus producing a more jumbled interlocked three-dimensional less-than-perfect crystal matrix which will have the ability to better interlock to the crevices, fissures and asperities of the epithelial layer, and will have the beneficial result of interlocking into different pathogens, such as viruses, bacteria and fungi found in these outer surface openings of the epithelial layer. This in turn helps prevent many of these pathogens from multiplying and/or retards the rate at which they would otherwise multiple. The other benefit of this growth pattern is that the microcrystalline structures provide strength to the overall tissue surface, and helps to prevent deflection and bending of the film and adjacent crystalline structures, which stabilizes the entire surface.

To the extent that there are cracks subsequently developing in the microcrystalline structures and matrix, the natural moisture exhalation process of the produce will tend to liquefy and re-establish the crystal boundaries along the crystalline cracks or fissures. As will be further understood from the descriptions below, the methods and equipment of the present invention assist in accelerated formation of these tiny crystalline structures, and in the polymerization and hardening of the solute layer over and interlocked into the outermost layer of the produce it substantially completely covers. Note that the thickness of this substantially dried solute layer may be in the range of about 0.001 mm to about 3 mm, and preferably is in the range of about 0.002 mm to about 1 mm, with ranges on the order of about 0.01 mm to about 0.5 mm also being suitable for use with many kinds of generally smooth skinned produce, such as apples or pears.

With reference to FIG. 1, the drying method of the present invention can be characterized by a few basic steps. The first step 10 is to remove at least a portion of the excess moisture from the solute-laden (e.g., sugar-containing, high moisture content) slurry layer on the external surface of the produce in order to produce a moisture-reduced slurry layer. Typically, this will be a mechanically performed step which will leave a sufficient slurry layer of solute substances (including sugars, acids, and enzymes) to subsequently form a protective (e.g., sugar) stratum, which will in turn crystallize into a protective exo-crystalline layer (hereinafter referred to as the "ECL"), both of which are discussed herein.

The second step 12 is the accelerated in-situ moisture removal of the moisture-reduced slurry layer to create what is referred to as the protective (e.g., sugar) stratum (having some moisture, but less than that of the initial slurry layer) which will ultimately become the ECL when even additional moisture is removed (e.g., evaporated). This accelerated in-situ moisture removal step relies upon the application of energy that preferably only significantly penetrates the slurry layer and a very small portion of the outermost layers of the produce, so as to avoid detrimental bulk heating of the produce. This energy may take one or forms of radiated energy applied simultaneously or sequentially, and the air currents passed by the produce may be also continued during the application of such radiated energy to the produce to help carry away released moisture vapor.

The radiated energy may take several forms: light, e.g., visible light, infrared (IR) light, ultraviolet (UV) light from one or more lamps or radiating elements preferably focused on the produce by suitable reflectors and/or lenses; high frequency radio waves from one or more radiators or antennas or reflectors generating very high frequency radio frequency (RF) radio waves, preferably in the microwave spectrum and most preferably in high end of the microwave spectrum; heat, e.g., thermal energy from one or more sources various sources preferably focused on the produce by suitable reflectors, radiating antennas or the like, with such thermal energy sources including producing heating elements or radiators producing IR energy, visible light, and/or UV energy. The application of such radiant energy, which preferably takes place while air currents are still directed past the produce, is to remove still more moisture from the moisture-reduced slurry layer without carrying from the produce the required solute molecules to eventually form the ECL. The term "stratum" is being used synonymously with the term "strata" because the protective (e.g., sugar) stratum of the present invention can comprise one or more discrete solute-containing layers during the course of the second step 12.

The third step 14 is the crystal-formation drying stage where the further removal of any remaining moisture in the protective (e.g., sugar) stratum occurs, preferably sufficiently slowly enough to allow the formation of somewhat larger crystals within the ECL. Thus, at this point, the external surface of the item of produce is completely, or at least substantially, enveloped by a protective crystalline structure.

This three step drying method can be performed in the same location, or preferably performed in slightly different locations as the produce is carried or transported from one location to another where suitable equipment is provided to carry out each of the three foregoing steps. Any suitable conveying mechanism, including rollers, rotating tables, fingers, conveyers, helical wires or the like can be employed to accomplish this result. The converging appliance method can be driven in any known or suitable manner including mechanically driven, pneumatically driven and/or gravity driven. The specific conveyor implementation is not believed to be critical to the success of the overall method.

Figure 2:
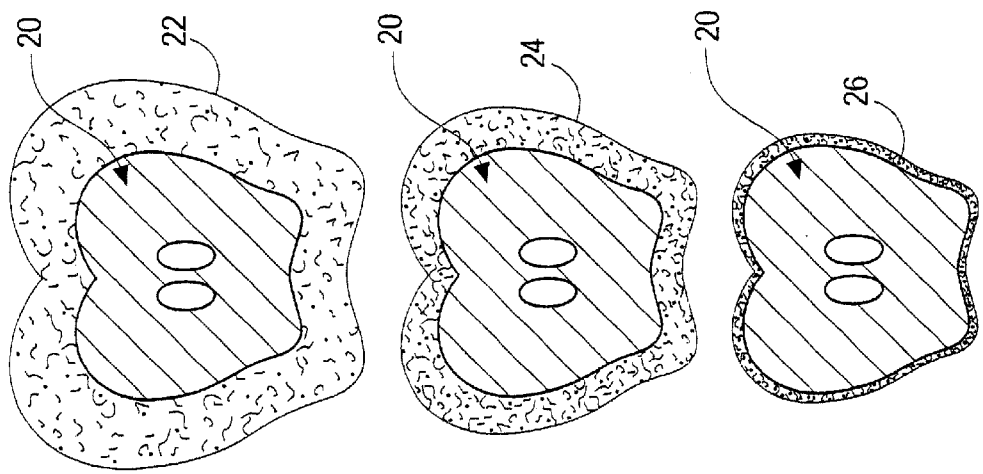
FIG. 2 is a cross-sectional view of an item of produce illustrating the change in appearance and composition of the various layers on the external surface of the item of produce after completion of each of the major produce drying steps depicted in FIG. 1, in accordance with one aspect of the present invention.

With reference to FIG. 2, there is shown several cross-sectional views of an item of produce illustrating the change in appearance and composition of the various solute-containing layers on the external surface of the item of produce after completion of each of the major produce drying steps previously discussed. The item of produce 20 (in this example, an apple) corresponds to an item of produce that has been subjected to drying step 10 in FIG. 1, i.e., the item of produce 20 has a reduced-moisture slurry layer 22. That same item of produce 20, which has been subjected to drying step 12 in FIG. 1, has a protective (e.g., sugar) stratum 24 with a relatively lower level of moisture (as compared to the moisture-reduced slurry layer 22). Finally, that same item of produce 20, which has been subjected to drying step 14 in FIG. 1, has a protective crystalline structure 26 (e.g., ECL) with a relatively low level of moisture (as compared to the protective (e.g., sugar) stratum 24, and especially the moisture-reduced slurry layer 22).

It should be noted that the item of produce 20 did not change appreciably in either shape or dimension during the course of the drying method of the present invention; i.e., it was the solute-containing layers 22, 24, and 26, respectively, that changed in shape and dimension. Accordingly, there should not be any appreciable shrinkage of produce that is processed in accordance with the drying method of the present invention.

Figure 2A:
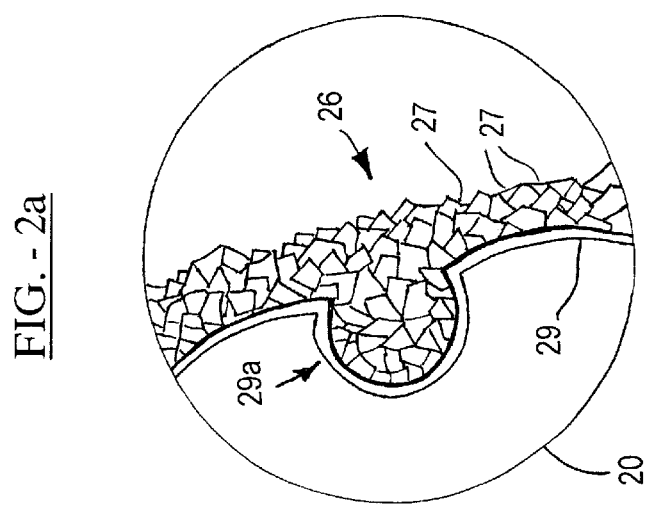
FIG. 2A is a partial cross-sectional view of a detail of the final protective film or layer including multiple crystalline structures formed on the external surface of the item of produce, in accordance with one aspect of the present invention.

With reference to FIG. 2A, there is shown a partial cross-sectional view of a detail of the final protective crystalline structure 26 formed on the external surface of the item of produce, in accordance with one aspect of the present invention. In this view, it can be seen that the protective crystalline structure 26 is actually comprised of a plurality of "micro-crystals" 27 which are substantially interlocked together to form a protective layer on the external surface 29 of the item of produce 20, as well as within the cavities formed by pores 29A.

The individual drying method steps and illustrative apparatuses for carrying out the same will now be described in greater detail. Each of the steps can be used to carry out some of the beneficial killing and/or elimination of the residual pathogens, as will be explained herein.

Figure 3:
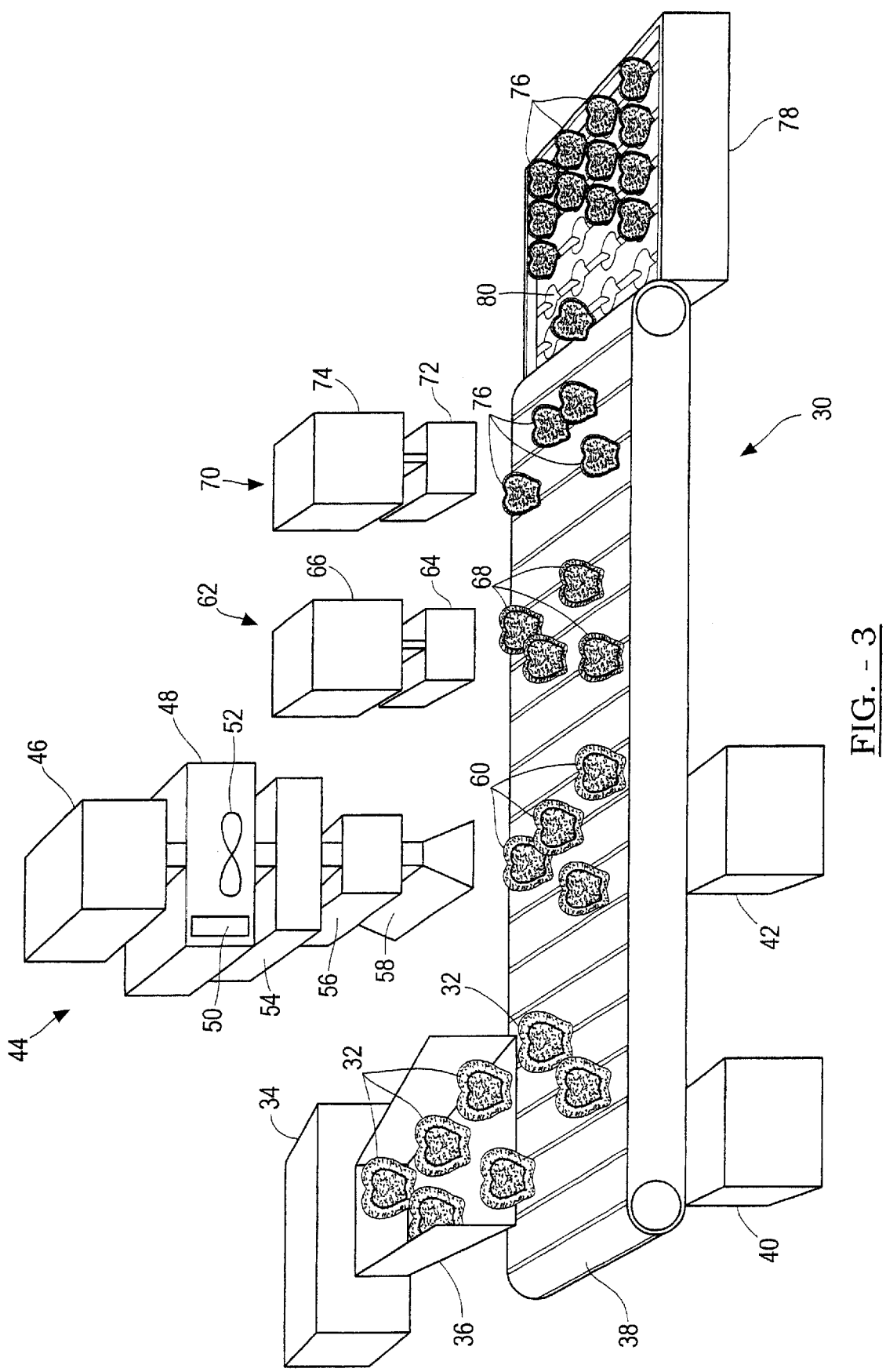
FIG. 3 is a schematic view of a produce drying system, in accordance with one aspect of the present invention.

With reference to FIG. 3, an illustrative apparatus 30 is shown for carrying out the drying method of the present invention. Initially, the produce 32 having a solute-laden slurry layer applied thereto (e.g., in a snap freeze tank 34) is transported to the apparatus 30 of the present invention by any number of conventional ways, such as, but not limited to a slide 36, or a chute, conveyor belt system, and the like.

The produce 32 having a solute-laden slurry layer applied thereto is then deposited onto a suitable transportation device, such as a conveyor belt system 38, which is preferably powered by driving means such as a motor 40. The conveyor belt system 38 can be controlled by a computer (not shown) in order to control speed, residence time, as well as other operational parameters.

The first step, the removal of excess moisture from the slurry layer, can be accomplished in a variety of ways, preferably with a subsonic air flow (i.e., forced air) and/or mechanical agitation (e.g., controlled shaking or vibration). The key consideration is that a suitable force is applied to the produce in such a manner so as to drive the excess moisture from the slurry layer.

The mechanical agitation can be carried out using an appropriately configured, selectively operable vibration device 42, such as commercially available vibratory systems used in many factories, arranged in a bowl or other suitable configuration. It should be noted that the terms "agitation" and "vibration" are being used synonymously throughout the instant application. Basically, these vibratory devices are motor-driven or piezoelectric-driven vibrating mechanisms which cause a mass, such as a bolt or screw, to be vibrated and assume an orientation as it moves along or bounces along in a bowl or a track. Such technology can be readily adapted to vibrate produce.

One beneficial use of the mechanical agitation is that all materials, whether alive or inert, have a mass, and every mass has a known harmonic or resonant frequency. When the organisms of a certain size are subjected to mechanical motion in the resonant frequency range and at the right amplitude, the pathogens can literally be shaken to death, i.e., fractured and otherwise broken, thus effectively killing the pathogen or otherwise rendering it harmless. Accordingly, it would be desirable to use a mechanical agitation at a suitable frequency to accomplish such killing of known pathogens. These harmonic frequencies typically will be several orders of amplitude higher than required to putt he relatively larger-sized produce (in comparison) into a resonant frequency mode, and thus, there will be no detrimental effect to the epithelial tissue or the internal pulp of the produce.

The subsonic air approach to removing excess moisture preferably employs a selectively operable mechanical air drying unit 44. The individual components of the unit 44 may vary; however, the unit 44 preferably includes an air source 46 (e.g., a pump or compressed air tank), a blower 48 (e.g., a motor 50 and a centrifugal fan 52), a filter 54, a temperature conditioner/control unit 56 (e.g., for providing a desired level of moisture/humidity, as well as for providing heating and/or refrigeration), and a suitably shaped nozzle 58 for providing a stream of smooth flowing (e.g., generally laminar) air toward the produce 32.

The subsonic air approach to removing excess moisture preferably uses a filtered, clean, temperature-controlled, humidity-controlled, velocity-controlled air stream which is brought across the produce 32 in any particular desired pattern. For example, if the produce is moving along a conveyor, the nozzle 58 can produce a subsonic jet stream which directs relatively high energy air toward the produce 32 that is sufficient to drive off the excess moisture droplets while leaving a suitable slurry layer on the produce 32 to create the subsequent protective (e.g., sugar) stratum so as to allow for the still subsequent crystal growth. Therefore, it is important that the directed stream of controlled air not drive off all of the moisture, and not drive away the solvent-laden slurry extracts which will form the protective (e.g., sugar) stratum from which the moisture is subsequently evaporated to form the ECL.

Preferably, the subsonic air would be humidity-controlled, and at a temperature designed to assist with killing or neutralizing pathogens. This relatively narrow stream or planar layer of air through which the produce 32 passes or which is passed over the produce 32, can be heated (e.g., by the temperature conditioner/control unit 56), so as to temporarily expose those residual pathogens on the outside surface of the produce 32 to a relatively high temperature momentarily, with a possible result of helping kill or neutralize the pathogens. The subsonic stream of air is preferably in the range of about room temperature to about 500° F., with temperatures in the range of at least about 140° F. with temperatures 165° F. and higher being more preferred, with temperatures of at least about 212° F. degrees and higher (at atmospheric pressure) being most preferred because the airborne contaminants will naturally be extinguished and moisture driven out therefrom.

This curtain of air from the nozzle 58 can be any suitable width from the order of a tenth of an inch thick (e.g., for relatively small items of produce) up to several inches (e.g., for relatively large items of produce), as required by the production exposure requirement. Ideally, the exposure time is sufficiently short so as to not raise the temperature of the produce surface above what is nominally acceptable and in accord with U.S. Food and Drug Administration standards for pasteurization, as well as other domestic and foreign regulatory agency requirements. Such produce surface temperatures are preferably kept below 165° F. and more preferably below 130° F., so as to not cause detrimental or cellular damage from the heat from overabundant transfer to the cell materials. Such detrimental heat transferwould promote tissue degradation and damage and thus reduce shelf life contrary to the goals of the present invention.

The subsonic air can be operated through any suitable pump 48, and run through one or more suitable filters 54. Another way of providing the heat-controlled, pathogen-free air is to draw air off of the outlet side of a heat exchanger (not shown) used to heat water or in other processes associated with the cleaning or washing process. For example, if the drying method of the present invention is used in conjunction with colder than room temperature water or air, the heat exchanger from a refrigeration unit (not shown) can be used as a source of warmed air. If a boiler (not shown) is used as a source of heated water, a suitable air-to-air heat exchanger (not shown), which can include conventional heat transfer structures (not shown) can be used to heat the air above 212° F. for sufficient time to kill airborne pathogens before directing that same air to the produce as part of the mechanical excess moisture removal station.

Although not required, and thus optional, selectively operable visible, infrared and/or ultraviolet light source devices (not shown) can be employed to accomplish the same purpose by accelerated flash drying of the excess moisture, while leaving a suitable protective (e.g., sugar) stratum on the produce surface.

Thus, after completion of the first step by either subsonic air flow and/or mechanical agitation, produce 60 having a moisture-reduced slurry layer is produced.

With reference to FIG. 4, there is shown an alternative embodiment of the invention in that the first step is carried out in an enclosed structure, for example, a hood 100 so as to be better able to control airflow direction and velocity, temperature, humidity, and other operating parameters. The aforementioned airflow, agitation, heat/light energy devices, as well as any ancillary equipment, could be housed, either completely or partially, within the hood 100. The hood 100 could extend down completely, or at least substantially, to the surface of the conveyor belt system 38 and could be equipped with an ingress device 102 (e.g., a selectively operable door or passage) for receiving the solute-laden produce 32 and an egress device 104 (e.g., a selectively operable door or passage) for expelling the produce 60 having a moisture-reduced slurry layer in preparation for the second step.

Referring again to FIG. 3, the second step, i.e., the accelerated in-situ moisture removal step, can employ one or more selectively operable light and/or heat energy source devices 62 (preferably including an energy source 64 and a control unit 66) to affect the further removal of moisture from the moisture-reduced slurry layer on the produce 60 to produce the produce 68 having a protective (e.g., sugar) stratum, without mechanically moving the slurry layer/protective stratum around on the produce surface. In otherwords, the key part of the drying process is to permit the formation of crystal nuclei upon which the solutes (e.g., sugars) will ultimately crystallize in their multiple crystal patterns thus forming the three-dimensional ECL on the surface of the produce. Initially, the slurry layer has excess moisture which must be driven off while not disturbing too much of the mechanical position of the crystal molecules, or else they are not able to nucleate at the parent receptor site on the apical tissue. Accordingly, this moisture removal step must rely upon the addition of one or more energy sources to cause an increase in Brownian motion and evaporate the excess moisture. This can be done at an accelerated rate using conventional convection oven techniques of moving dry, temperature-controlled air which is passed across the forming protective stratum. Reduced moisture air levels are preferred, since they accelerate the conversion of liquid water molecules to gaseous water molecules on account of their Brownian motion. Alternatively, or in addition, thermal (i.e., heat) radiation of the infrared variety and/or light radiation at visible or ultraviolet levels can be used to heat both the resulting protective (e.g., sugar) stratum and the outermost layers of the tissue so as to increase the overall temperature level of the protective (e.g., sugar) stratum and promote the nucleation of solute (e.g., sugar) crystals, as well as drive out excess moisture while not moving the protective (e.g., sugar) stratum. As an example, where $H_2O$ is the solvent and a significant percentage of sugar slurries in the solute, and the drying process results in the concentration of the solute in the liquid solvent, ultimately resulting in the formation of dry crystal structures growing outwardly from nucleation sites, which when magnified many times resemble miniaturized conglomerations of rock candy pieces in appearance.

The thermal (i.e., heat) and/or visible light or UV energy which is used, is preferably selected to be in a range, in terms of duration frequencies and power levels, that do not produce significant detrimental tissue transformations, including DNA breakages and/or other degradations, including macromolecular damage or damage to organelles. The light can be provided at a steady amplitude, or can be pulsed. Wave forms of differing types can be used and energy levels at different types can be used. All of the exposures should be calculated not to excessively cause the above-noted damaging effects to the tissue of the produce, but should be strong enough and in the right range of frequencies, so that the exposure of infrared and/or ultraviolet light energies to the residual pathogens still resident in the protective (e.g., sugar) stratum or on or in the topmost layers of tissue in the produce will beneficially result in their destruction and/or neutralization such as by breakage. However, the more advanced large life forms, namely the produce structures themselves, will not be harmed as long at the concentrations of infrared, visible and/or ultraviolet energies are not too great, particularly since their outer layers and even internal tissues are typically designed by nature to resist damage from light sources, including IR and UV radiation from substantially full day-long sun exposure.

It is expected that for different varieties of produce, such as strawberries, peppers, tomatoes and apples, different levels of energy can be desirable in terms of creating the desired accelerated drying time. For example, more hearty produce, such as apples or peppers may be able to be exposed to larger doses of energy at a greater range of frequencies than more delicate vegetation such as strawberries or broccoli.

It is important to note that ionizing microwave frequency energy sources preferably not are used. In this regard, the UV exposure should be controlled. For example, UVB radiation is at a higher frequency than UVA radiation and the radiation frequencies can be selected to control the depth of penetration of the radiation dependent upon how hearty the epithelial layer of produce tissue is to damage from such sources. For example, shucked corn could be processed this way and have its life extended. However, because corn normally grows inside the husk it is not as resistant to UV damage as an item of produce such as an apple or a pepper, which is normally bathed in sunlight which includes UV radiation on a regular basis and obviously is designed to withstand such radiation without harmful effects.

Figure 4:
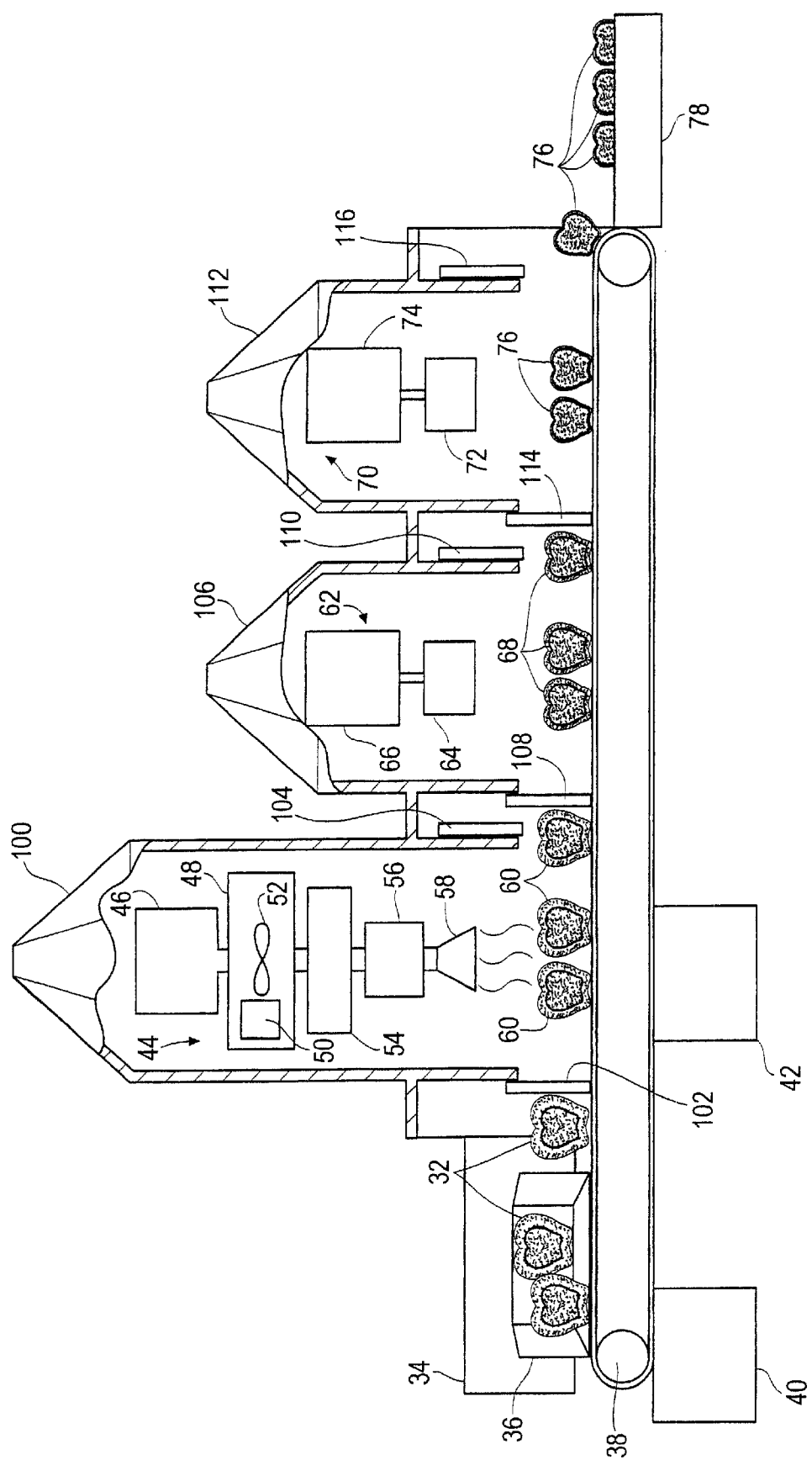
FIG. 4 is a schematic view of an alternative produce drying system, in accordance with one aspect of the present invention.

Referring again to FIG. 4, there is shown an alternative embodiment of the invention in that the second step can be carried out in an enclosed hood 106 or a fully enclosed chamber (not shown) so as to be better able to control various operating parameters, such as temperature and light levels. The aforementioned heat/light energy devices, as well as any ancillary equipment, could be housed within the hood 106. The hood 106 could extend completely, or at least substantially, down to the surface of the conveyor belt system 38 and could be equipped with an ingress device 108 (e.g., a selectively operable door or passage) for receiving the produce 60 and an egress device 110 (e.g., a selectively operable door or passage) for expelling the produce 68 having a protective (e.g., sugar) stratum in preparation for the third step.

Referring again to FIG. 3, the third step, i.e., the crystal-formation drying step, can employ one or more selectively operable light and/or heat energy source devices 70 (preferably including a energy source 72 and a control unit 74) to affect the further removal of moisture from the protective (e.g., sugar) stratum on the produce 68 to produce the produce 76 having a crystalline structure.

The crystal-formation drying stage will typically be conducted slower than the accelerated in-situ moisture removal step because most of the moisture is now gone from the protective (e.g., sugar) stratum, and the final mechanical motions of the molecules to form sugar crystals are taking place, which are believed to form in a larger not susceptible to accelerated processing, but instead takes a little bit of time measured from a few seconds up to a few minutes or longer. This step can also be called the stabilization of the protective (e.g., sugar) stratum. It represents the conclusion of the removal of most of the solvent from the solute, including substantially removing most moisture from the interstices between adjacent growing crystals, so as to allow the crystal formations to grow together and thus interlock in the three-dimensional ECL on the external surface of the produce 76. The step also helps lock the crystals into the epidermal layer of the skin, because the individual amorphous crystalline micro-crystalline structures now grow into an overall conglomerate crystalline structure which spans the width and/or the length of one or more of the crevices, and fissures or asperities in the skin of the produce 76. Also, the growth of these microminiature crystalline structures relies on the molecular alignment of the polar molecules into the precise orientation required by the individual single-crystal lattices being formed. Crystalline structures typically rely upon ionic and covalent bonding and assume a pre-defined crystal lattice form associated with the specific chemical compounds which are effectively precipitated out of their solution and arrive in an amorphous pre-crystalline mix or layer with minimal solvent present. The microcrystalline structure which is formed is allowed to expand as the solvent evaporates, and the microcrystalline structures become interconnected forming an imperfect macro-crystal lattice at a three-dimensional level which is locked into the crevices, fissures and asperities of the skin of the produce 76. The solutes (e.g., sugars) during this stage typically go from a sticky or tacky state to a dry-to-the-touch state. Although some moisture can remain and evaporate later, the produce 76, with its protective (e.g., sugar) crystal coating known as the ECL is now sufficiently dried to allow for packaging. Packaging can be done using any suitable technique, including by hand. Preferably, such hand-packaging will be done by a worker having a protective sanitary or sterile glove so that the natural floral, fauna and chemicals (e.g., oils) present on the human hand are not allowed to transfer to or contact the film or crystalline structures. Instead, the produce can be packed into previously clean and/or sterile containers 78 with suitable packaging materials 80 including clear tissue, papers and other media.

The energy levels used to accomplish this final drying step are typically less than in the second step. Additionally, this drying step is not so vigorous as to disrupt the cohesion environment that is being created for the protective (e.g., sugar) stratum and the produce. Preferably, the solute-laden slurry which becomes the protective (e.g., sugar) stratum and then becomes a film including the crystalline structure (i.e., ECL), that is composed of the same solutes (e.g., proteins, enzymes, sugars) which exist naturally in the produce. Thus, there is a cohesive bonding, in addition to simple adhesion and mechanical interlocking, between the localized solute (e.g., sugar) molecules present in the epithelial layer and the protective (e.g., sugar) stratum. Thus, under the final drying step, the drying is sufficiently slow and non-vigorous so as to allow the amorphous and microcrystalline structures developing in the protective stratum to chemically interlock by both adhesion and chemical bonding to similar microscopic crystalline structures found on and/or protruding the surface of the epithelial tissue of the produce. Accordingly, the bond between the produce and the protective (e.g., sugar) stratum is not merely adhesion, but in fact there is a chemical and mechanical interlock between the natural tissue structures of the produce, which includes (e.g., sugars, protein and enzyme structures), and the protective stratum, which preferably has a similar composition but is several to many times drier, in terms of moisture content. Additionally, it is important to note that since the solute-laden slurry is preferably made from these same produce components, the desired bonding also occurs quite naturally at suitable temperatures and moisture conditions between the protein, enzyme, and starch molecules in the solute-laden slurry and the protein, enzyme and starch molecules in the epithelial layer of the produce. Produce, when heated to suitable temperatures, automatically exhibits self-healing characteristics. The cellular structures within the outer layer of the produce, being unable to distinguish between themselves and the slurry compounds which genetically mirror their own DNA structures, find themselves engaging in mutually beneficial coexistence and intercellular preservation functions. In other words, even after produce is picked or harvested, the cells of the epithelial layer are engaged in a survival regime to allow them to exist as long as their energy sources allow.

In this crystal formation step, the energy applied should be sufficient to allow the solutes (e.g., proteins and sugars) to go from their sticky or tacky state to a dry-to-the-touch state. But not so much energy should be applied that extensive structural damage or severe degeneration of the outermost layers of the produce results. The energy source can be again by high radio-frequency energy, heat, light, or any other type of energy from a suitable selectively operable energy source device that permits the removal of moisture from the protective (e.g., sugar) stratum and the proper formation of the crystalline structure. Preferably, the heat ranges for the outermost layers or skin of the produce will be less than 150° F. and preferably less than 125° F. for most types of produce. For those types of produce used to higher temperatures, they can be exposed to higher process temperatures. For example, an eggplant has a purplish black surface and absorbs a substantial amount of light. Thus, its cellular structure is designed to withstand greater amounts of heat than might be withstood by a strawberry or a peach which typically grows best in shaded conditions. Thus, the highest allowable process temperatures are determined in part by the ability of the particular variety or species of produce to withstand heat, sun or other severe weather conditions.

Referring again to FIG. 4, there is shown an alternative embodiment of the invention in that the third step can be carried out in an enclosed hood 112 so as to be better able to control various operating parameters, such as temperature and light levels. The aforementioned heat/light energy devices, as well as any ancillary equipment, could be housed within the hood 112. The hood 112 could extend completely, or at least substantially, down to the surface of the conveyor belt system 38 and could be equipped with an ingress device 114 (e.g., a selectively operable door or passage) for receiving the produce 68 and an egress device 116 (e.g., a selectively operable door or passage) for expelling the produce 76 having a crystalline structure in preparation for packaging.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An apparatus for extending the shelf life of harvested produce by accelerated drying of a natural coating on the produce without detrimentally affecting the taste of or moisture content of the internal pulp of the produce, which coating initially starts out as a solute-laden slurry layer including excess moisture on the outermost layer of individual members of the produce and is substantially dried by the apparatus to form the natural coating on the individual members of the produce which helps protect the produce against deterioration, the apparatus comprising:

a selectively operable first mechanical force assembly for directing a mechanical force to impinge upon the produce, the mechanical force being a subsonic forced air stream, the force assembly being arranged and operable to direct the forced subsonic air stream at the produce for the purpose of removing excess moisture from the solute-laden layer without any significant removal of moisture from the produce itself and without any significant internal heating of the produce substantially below the outer layer of individual members of the produce;

a selectively operable first energy source assembly for directing a first form of non-mechanical energy at the outermost layer of the produce for the purpose of further removing excess moisture from the solute-laden layer without any significant removal of moisture from the produce itself and without any significant internal heating of the produce substantially below the outer layer of the produce; and a selectively operable second energy source assembly for directing a second form of non-mechanical energy at the outermost layer of the produce for the purpose of drying the solute-laden layer into a film which substantially covers the produce without any significant removal of moisture from the produce itself, with the second energy source assembly being arranged and operable to yield, within the film formed from the solute-laden layer, microminiature crystalline structures which are mechanically interlocked to the parts of the outer layer of the produce.

2. The apparatus according to claim 1, further comprising:
a selectively operable transportation assembly for transporting the produce to and from the first mechanical force assembly, first energy source assembly, and second energy source assembly in sequence.

3. The apparatus according to claim 1, further arranged to neutralize at least some residual pathogens that may be found in the outermost layer of the produce, and further comprising a second mechanical force assembly that includes at least one ultrasonic sound stream-producing assembly which is arranged and operable to direct ultrasound having a frequency several orders higher than the frequency than the resonant frequency of the produce in order to render harmless at least some pathogens that may be found on the outermost layer of individual members of the produce.

4. The apparatus according to claim 1, further arranged to neutralize at least some residual pathogens that may be found in the outermost layer of the produce, wherein the non-mechanical energy of the first and second energy sources is selected from the group consisting of light sources, heat sources, radio frequency energy sources and combinations thereof, with at least one of first and second energy sources being a light source, with the energy source assembly including such light source being arranged and operable so that, during its operation, at least some of the pathogens that still may be resident in the in the outermost layer of the produce are exposed to light energies sufficient to result in their neutralization without any substantial detrimental effect to the internal pulp of the produce.

5. An apparatus for extending the shelf life of harvested produce, wherein the produce initially has a solute-laden slurry layer including excess moisture applied to at least a portion of the external surfaces thereof, and the slurry layer is dried in an accelerated manner, without significantly reducing the moisture content inside of the produce, in order to form a film on the produce that helps protect the produce against deterioration, the apparatus comprising:

a selectively operable air stream assembly for directing a heated air stream at the produce in order to remove at least a portion of the moisture in the solute-laden slurry layer to form a moisture-reduced slurry layer on the external surfaces of the produce, without substantially heating the interior of the produce and without significantly reducing the moisture contained within the produce;

a selectively operable first energy source assembly for directing energy to the produce in order to remove at least a portion of the moisture in the moisture-reduced slurry layer to form a protective stratum on the external surfaces of the produce without significantly reducing the moisture content inside of the produce; and a selectively operable second energy source assembly for directing energy to the produce in order to remove at least a portion of the moisture in the protective stratum to form a protective crystalline structure on external surface of the produce without significantly reducing the moisture content inside of the produce.

6. The apparatus according to claim 5, further comprising a selectively operable transportation assembly for transporting the produce to and from the air stream assembly, first energy source assembly, and second energy source assembly, the transportation assembly including at least a first mechanical conveyance means for moving the produce in a predetermined elongated path having first, second and third locations spaced from one another, with produce placed on the conveyance means reaching the first, second and third locations in sequence as the produce is moved by the conveyance means, and wherein the air stream assembly is arranged to direct its air stream at the produce in the first location of the predetermined path;

the first energy source assembly directs its energy at the produce in the second location of the predetermined path; and the second energy source assembly directs its energy at the produce in the third location of the predetermined path.

7. The apparatus according to claim 5, further comprising a selectively operable vibration assembly for vibrating the produce at frequencies suitable to accomplish killing of at least some known pathogens that may be resident on external surfaces of the produce, with such frequencies being at least several orders of magnitude higher than required to put the produce into a resonant frequency mode, whereby such pathogens are rendered harmless without any substantial detrimental effect to the epithelial tissue of the produce.

8. The apparatus according to claim 5, wherein the energy of the first and second energy sources is a nonmechanical energy source selected from the group consisting of light, heat, and combinations thereof, with at least one of the first and second energy source assemblies being arranged and operable to apply its energy source to the external surfaces of the produce at an intensity and duration sufficient to neutralize at least some of the pathogens that may still be resident on the external surfaces and to avoid any substantial detrimental effect to the internal pulp of the produce.

* * * * *